United States Patent
Sweitzer

(10) Patent No.: US 7,023,911 B1
(45) Date of Patent: Apr. 4, 2006

(54) METHOD AND APPARATUS FOR ALTERING A ROUND TRIP DELAY MEASUREMENT IN A TELECOMMUNICATION SYSTEM TO ACCURATELY POSITION AN ECHO CANCELLER

(75) Inventor: Steven R. Sweitzer, Hillsborough, CA (US)

(73) Assignee: GoDigital Networks Corporation, Fremont, CA (US)

( * ) Notice: Subject to any disclaimer, the term of this patent is extended or adjusted under 35 U.S.C. 154(b) by 906 days.

(21) Appl. No.: 09/811,355

(22) Filed: Mar. 16, 2001

Related U.S. Application Data

(60) Provisional application No. 60/190,169, filed on Mar. 17, 2000.

(51) Int. Cl.
*H04B 17/00* (2006.01)
*H04B 3/46* (2006.01)
*H04Q 1/20* (2006.01)

(52) U.S. Cl. .................................. 375/224; 375/222
(58) Field of Classification Search ............... 375/222, 375/224, 227, 259; 455/422.1; 370/492
See application file for complete search history.

(56) References Cited

U.S. PATENT DOCUMENTS

| | | | | |
|---|---|---|---|---|
| 5,953,658 A | * | 9/1999 | Scott | 455/422.1 |
| 6,052,412 A | | 4/2000 | Ruether et al. | 375/231 |
| 6,151,364 A | | 11/2000 | Ruether et al. | 375/254 |
| 6,236,664 B1 | * | 5/2001 | Erreygers | 370/492 |
| 6,351,495 B1 | * | 2/2002 | Tarraf | 375/259 |
| 6,661,837 B1 | * | 12/2003 | Davis et al. | 375/227 |

* cited by examiner

*Primary Examiner*—Stephen Chin
*Assistant Examiner*—Curtis Odom
(74) *Attorney, Agent, or Firm*—Sierra Patent Group, Ltd.

(57) ABSTRACT

Method and apparatus for altering a round trip delay measurement in a multiple subscriber carrier pair gain system to accurately position echo cancellation where the overall delay is measured by the near end modem and when this measurement is made, it is detected to alter local delays by bypassing filters and buffers to momentarily shorten the overall delay until the measurement is completed. Alternatively, the return signal is interrupted and the round trip delay response is simulated when a round trip delay measurement is being made. In this manner, the simulated signal is received at the originating end and used for delay measurement resulting in a shorter delay being measured.

5 Claims, 3 Drawing Sheets

METHOD AND APPARATUS FOR ALTERING A ROUND TRIP DELAY MEASUREMENT IN A TELECOMMUNICATION SYSTEM TO ACCURATELY POSITION AN ECHO CANCELLER

RELATED APPLICATION

This application claims priority under 35 USC §119 to provisional application No. 60/190,169 entitled "Method and Apparatus for Altering a Round Trip Delay Measurements in a Telecommunication System to Accurately Position an Echo Canceller" filed on Mar. 17, 2000.

BANKGROUND OF THE INVENTION

1. Field of the Invention

The present invention is related to data and/or voice signal transmission in communication systems. In particular, the present invention is related to method and apparatus for altering a round trip delay measurement in a pair gain multiple subscriber carrier communication system to accurately position an echo canceller.

2. Description of the Related Art

In many telecommunication applications such as modem systems, there are digitally implemented echo cancellation circuits to cancel echoes such as line echoes and improve the circuit connectivity. These echo cancellation circuits are frequently positioned in a connection of the data transmission path, if intermediate echo points are not expected, by measuring the total round trip delay and then placing the echo cancellation circuit at a point approximately half of the total delay. This approach assumes that the data transmission paths have equal delays in both upstream and downstream directions.

In some communication applications such as in pair gain systems, intermediate echo points may be introduced to accommodate the additional 2 to 4 wire conversion points generally found between the central office unit and the central office switch. If the pair gain system introduces delay due to processing and signal transmission, the intermediate echo point may be moved sufficiently far from the far end echo point such that an echo cancellation circuit positioned at a point approximately half the total delay will be unable to cancel the intermediate echo. If this intermediate echo is missed and therefore not canceled, the communication system connection may be severely degraded and can result in a slow or even lost connections.

SUMMARY OF THE INVENTION

In view of the foregoing, in accordance with the present invention, there is provided method and apparatus for detecting when a round trip delay measurement, and specifically during v.90 modem training intervals, is being made and to momentarily reduce the connection delay to result in a smaller measured delay such that intermediate echoes, for example, may be accurately cancelled.

In particular, in accordance with one embodiment of the present invention, there is provided a method of altering a round trip delay measurement in a communication system, comprising the steps of receiving an input signal, determining whether a predetermined tone sequence is detected, and processing the input signal and generating a corresponding digital signal, wherein when the tone sequence is detected, routing the digital signal to an output terminal, and further, where if the tone sequence is not detected, routing the input signal to the output terminal. In particular, the tone predetermined tone sequence may include a B/Bbar signal. Furthermore, the detection of the tone sequence may indicate that a round trip delay is measured.

In accordance with another embodiment of the present invention, there is provided an apparatus for altering a round trip delay measurement in a communication system, comprising a detector configured to receive an input signal and to detect a predetermined tone sequence, a digital signal processor for processing the input signal and generating a corresponding digital signal, and a selector coupled to the detector and the digital signal processor, the selector configured to receive the input signal and the digital signal, wherein when the detector detects the predetermined tone sequence, the selector may be configured to provide the digital signal to an output terminal, and further, when the detector does not detect the predetermined tone sequence, the selector may be further configured to output the input signal to the output terminal.

Moreover, the predetermined tone sequence may include a B/Bbar signal, and further, a detection of the predetermined tone sequence by the detector may indicate that a round trip delay is measured.

In accordance with yet another embodiment of the present invention, there is provided a method of altering a round trip delay measurement in a communication system, comprising the steps of monitoring an upstream data transmission path for a predetermined tone sequence, generating an artificial delay signal upon detecting the predetermined tone sequence, the artificial delay signal being shorter than an actual delay signal, and introducing a phase reversal in the downstream data transmission path. Furthermore, the predetermined tone sequence may include an A/Abar signal.

In accordance with still another embodiment of the present invention, there is provided an apparatus for altering a round trip delay measurement in a communication system, comprising a detector for monitoring an upstream data transmission path for a predetermined tone sequence, a delay unit for generating an artificial delay signal when the predetermined tone sequence is detected, the artificial delay signal being shorter than an actual delay signal, and a phase reversal unit for providing a phase reversal in the downstream data transmission path. Additionally, the predetermined tone sequence may include an A/Abar signal.

In accordance with a further embodiment of the present invention, there is provided a round trip delay measurement method, comprising the steps of monitoring a downstream data transmission path for a predetermined tone sequence, generating a delay signal upon detecting the predetermined tone sequence, and introducing a phase reversal in an upstream data transmission path. Moreover, the predetermined tone sequence may include a B/Bbar signal, while the method may further include the steps of transmitting the predetermined tone sequence, receiving the phase reversal. Additionally, a round trip delay may include the time period from the transmission of the predetermined tone sequence to the reception of the phase reversal.

In accordance with still yet another embodiment of the present invention, there is provided an apparatus for altering a round trip delay measurement in a communication system, comprising means for receiving an input signal, means for determining whether a predetermined tone sequence is detected, means for processing the input signal and generating a corresponding digital signal, and means for routing the digital signal to an output terminal when the tone sequence is detected, the routing means further configured to route the input signal to the output terminal when the tone sequence is not detected.

In accordance with still a further embodiment of the present invention, there is provided an apparatus for altering a round trip delay measurement in a communication system, comprising means for monitoring an upstream data transmission path for a predetermined tone sequence, means for generating an artificial delay signal upon detecting the predetermined tone sequence, the artificial delay signal being shorter than an actual delay signal, and means for introducing a phase reversal in the downstream data transmission path.

Indeed, in accordance with one aspect of the present invention, the overall delay may be measured by a near end modem, and when the measurement is made, it is detected to alter local delays by bypassing filters and buffers to momentarily shorten the overall delay until the measurement is completed. Additionally, the return signal may be interrupted and the round trip delay response may be simulated when a round trip delay measurement is being made. In this manner, the simulated signal is received at the originating end and used for delay measurement resulting in a shorter measured delay.

These and other features and advantages of the present invention will be understood upon consideration of the following detailed description of the invention and the accompanying drawings.

DETAILED DESCRIPTION OF THE PREFERRED EMBODIMENT

Figure 1:
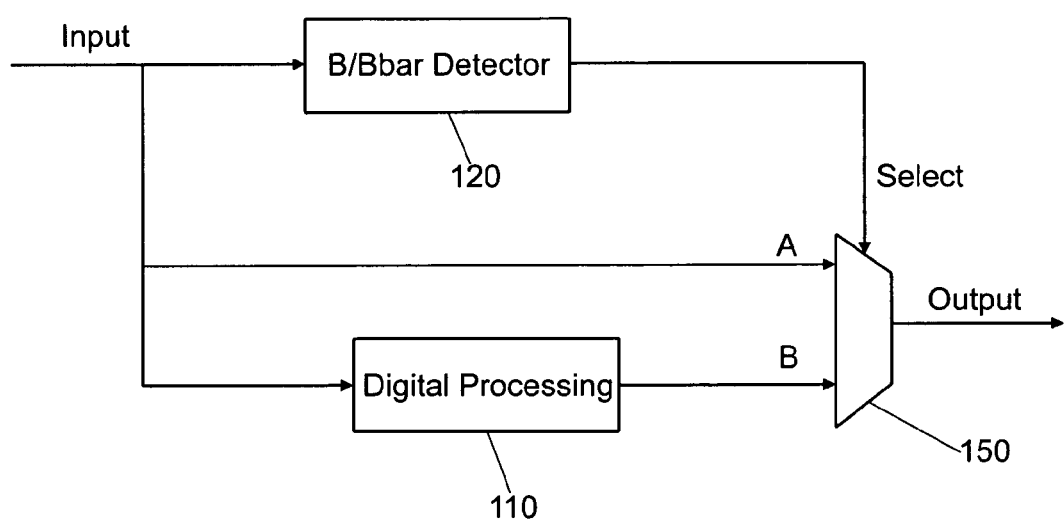
FIG. 1 illustrates a block diagram of the round trip delay measurement in accordance with one embodiment of the present invention.

FIG. 1 illustrates a functional block diagram of a round trip delay measurement section for use in a pair gain type communication system in accordance with one embodiment of the present invention. Referring to FIG. 1, in the round trip delay measurement section 10, there is provided a digital processing block 110, a B/Bbar detector 120 and a selection unit 130. As shown, the input signal is provided to each of the B/Bbar detector 120, the digital processing block 110 and the selection unit 130, while the output signal of the round trip delay measurement section 10 is generated by the selection unit 130.

During a normal operation, the input signal passes through the digital processing block 110 as it is transmitted from the input terminal to the output terminal. The digital processing block 110 can add considerable amount of delay to the overall signal transmission, which may result in communication network equipment transmitting the signal (provided to each of the B/Bbar detector 120, the digital processing block 110 and the selection unit 130) to place an echo canceller improperly.

Accordingly, in a v.90 standard data transmission applications, the round trip delay measurement section 10 may be configured to monitor the input for a particular tone sequence at the B/Bbar Detector 120 that the v.90 server modem (the device sourcing the input, not shown) sends to indicate that it has completed measuring the round trip delay. Thus, prior to detecting the B/Bbar signal, the round trip delay measurement section 10 may be configured to route the signal from the input terminal (essentially the input signal) to terminal "A" of the selection unit 130, which, in turn, selects "A" to transmit the signal straight to the output terminal effectively bypassing the digital processing block 110. On the other hand, when B/Bbar signal is detected at the B/Bbar detector 120, the round trip delay measurement section 10 may be configured such that the selection unit 130 is configured to deselect "A" and instead, to select "B" thereby routing the output of the digital processing block 110 to the output of round trip delay measurement section 10. In this manner, the server modem for the data communication network may be configured to measure the round trip delay without the digital signal processing block 110 in the path resulting in a lower measured value.

Figure 2:
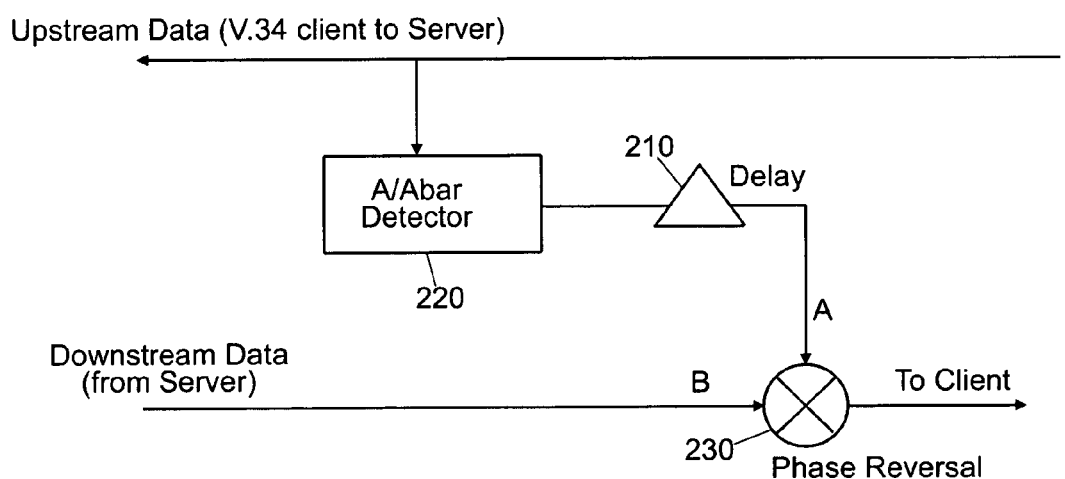
FIG. 2 illustrates a block diagram of the round trip delay measurement in accordance with another embodiment of the present invention.

FIG. 2 illustrates a functional block diagram of the round trip delay measurement section for a pair gain communication system in accordance with another embodiment of the present invention. Referring to FIG. 2, the round trip delay measurement section 20 is provided with an A/Abar detector 220, a delay block 210, and a phase reversal section 230. In one embodiment, the round trip delay is measured by the round trip delay measuring section 20 by determining the time that is taken to transmit a signal to one end and receiving a reply signal in response thereto. For example, in the case of modem applications such as v.90 modems, the round trip delay measurement may be performed by having the two ends of the modem connection transmit a series of tones, responses, and phase reversals.

In particular, the round trip delay measurement section 20 is configured to monitor one signal direction (in this case, the upstream data path from v.34 client to the server terminal) for the A/Abar signal at the A/Abar detector 220. When the A/Abar signal is detected, the round trip delay measurement section 20 is configured to provide an artificial delay at delay block 210 and introduce a phase reversal in the opposite direction at the phase reversal section 230. If the artificial delay provided at the delay block 210 is made shorter than the actual delay, the phase reversal introduced by the phase reversal section 230 may be configured to introduce the phase reversal prior to the phase reversal appearing at "B" such that the resulting round trip measurement is shorter.

Figure 3:
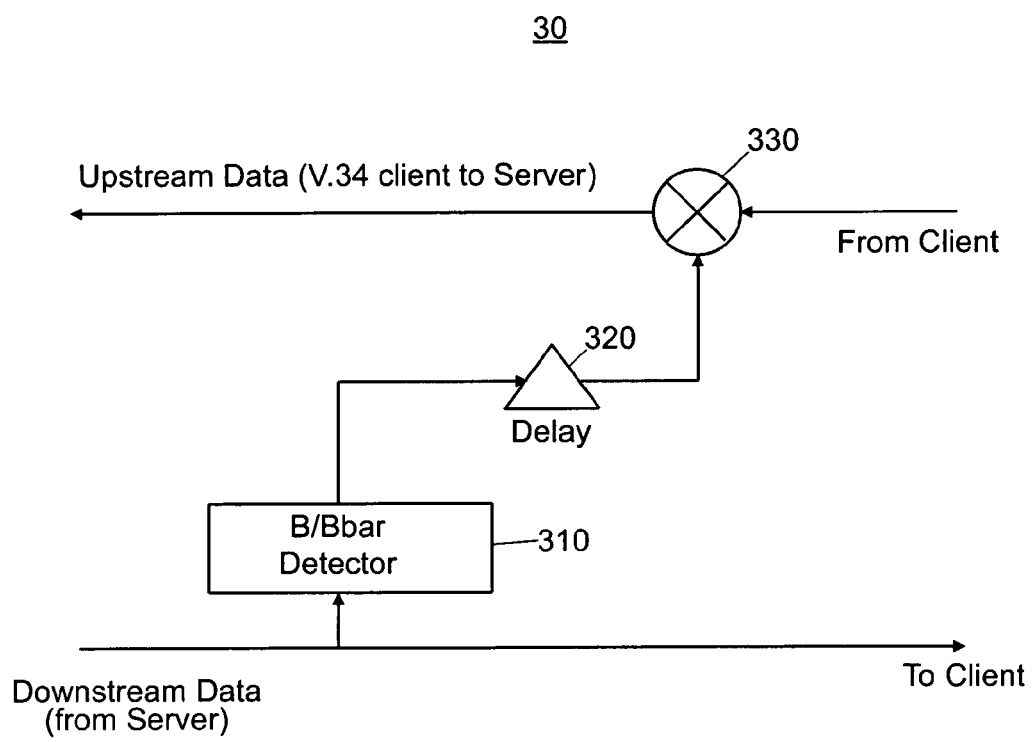
FIG. 3 illustrates a block diagram of the round trip delay measurement in accordance with yet another embodiment of the present invention.

FIG. 3 illustrates a block diagram of the round trip delay measurement section for a pair gain communication system in accordance with yet another embodiment of the present invention. Referring to FIG. 3, the round trip delay measurement section 30 includes a B/Bbar detector 310, a delay unit 320 and a phase reversal section 330. As shown, the B/Bbar detector 310 is provided in the downstream data path from the server to the client terminal. Moreover, the phase reversal section 330 is provided in the upstream data path from the client terminal to the server, with the delay unit 320 provided between the B/Bbar detector 310 and the phase reversal section 330.

Accordingly, in one embodiment of the round trip delay measurement section for the pair gain communication system, the B/Bbar detector 310 may be configured to detect a round trip delay measurement performed by the server at the server terminal (not shown). In particular, after a predetermined delay at the delay unit 320, a control signal may be generated and provided to the phase reversal section 330 to reverse the phase of the upstream signal in the upstream data path. Since the round trip delay is measured by the time from the server terminal transmitting the B/Bbar transition to receiving a phase reversal, in this manner, the server terminal may be configured to measure a shorter delay in the case that the predetermined delay at the delay unit 320 results in a phase reversal of the upstream signal in the upstream data path at the phase reversal section 330 in advance of the phase reversal from the client terminal. Moreover, the delay unit 320 may be configured to remove the phase reversal from the upstream data path at the phase reversal section 330 after an additional predetermined period of time to allow the upstream data path to revert to the normal operation.

As described above, in accordance with one aspect of the present invention, the overall delay may be measured by a near end modem, and when the measurement is made, it is detected to alter local delays by bypassing filters and buffers to momentarily shorten the overall delay until the measurement is completed. Additionally, the return signal may be interrupted and the round trip delay response may be simulated when a round trip delay measurement is being made. In this manner, the simulated signal is received at the originating end and used for delay measurement resulting in a shorter measured delay.

In this manner, in accordance with the present invention, there is provided method and apparatus for detecting when a round trip delay measurement, and specifically, during v.90 modem training intervals, round trip delay measurement may be performed and momentarily reduces the connection delay resulting in a smaller measured delay such that intermediate echoes, for example, may be accurately cancelled.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of altering a round trip delay measurement in a communication system, comprising the steps of:

receiving an input signal;

determining whether a predetermined tone sequence is detected wherein the detection of said tone sequence indicates that a round trip delay is measured; and processing said input signal and generating a corresponding digital signal;

wherein when the tone sequence is detected, routing said digital signal to an output terminal, and further, wherein if the tone sequence is not detected, routing said input signal to said output terminal.

2. The method of claim 1 wherein said communication system includes a pair gain system.

3. An apparatus for altering a round trip delay measurement in a communication system, comprising:

a detector configured to receive an input signal and to detect a predetermined tone sequence wherein a detection of said predetermined tone sequence by said detector indicates that a round trip delay is measured;

a digital signal processor for processing said input signal and generating a corresponding digital signal; and a selector coupled to said detector and said digital signal processor, said selector configured to receive said input signal and said digital signal;

wherein when said detector detects said predetermined tone sequence, said selector is configured to provide said digital signal to an output terminal, and further, when the detector does not detect said predetermined tone sequence, said selector is further configured to output said input signal to said output terminal.

4. The apparatus of claim 3 wherein said communication system includes a pair gain system.

5. An apparatus for altering a round trip delay measurement in a communication system, comprising:

means for receiving an input signal;

means for determining whether a predetermined tone sequence is detected wherein a detection of said predetermined tone sequence by said detector indicates that a round trip delay is measured;

means for processing said input signal and generating a corresponding digital signal; and means for routing said digital signal to an output terminal when said tone sequence is detected, said routing means further configured to route said input signal to said output terminal when said tone sequence is not detected.

* * * * *